United States Patent
Yuan

(10) Patent No.: US 9,444,170 B1
(45) Date of Patent: Sep. 13, 2016

(54) ELECTRONIC CHARGING DEVICE FOR VEHICLES AND METHOD FOR MAKING SAME

(71) Applicant: Aiyi Lu, Shenzhen (CN)

(72) Inventor: Zhendong Yuan, Shenzhen (CN)

( * ) Notice: Subject to any disclaimer, the term of this patent is extended or adjusted under 35 U.S.C. 154(b) by 0 days.

(21) Appl. No.: 14/994,329

(22) Filed: Jan. 13, 2016

(30) Foreign Application Priority Data

Dec. 21, 2015 (CN) .......................... 2015 1 0967070

(51) Int. Cl.
  *H01R 3/00* (2006.01)
  *H01R 13/24* (2006.01)
  *H02J 7/00* (2006.01)
  *H01R 43/20* (2006.01)

(52) U.S. Cl.
  CPC .......... *H01R 13/2421* (2013.01); *H01R 43/20* (2013.01); *H02J 7/0042* (2013.01)

(58) Field of Classification Search
  CPC ............................... H01R 24/58; H01R 31/06
  USPC .......................... 439/668, 669, 638, 131, 640
  See application file for complete search history.

(56) References Cited

U.S. PATENT DOCUMENTS

| | | | | |
|---|---|---|---|---|
| 5,690,509 A | * | 11/1997 | Eisenbraun | ............ H01R 24/58 439/490 |
| 6,305,945 B1 | * | 10/2001 | Vance | ................ H01R 13/5213 439/218 |
| 6,394,851 B1 | * | 5/2002 | Paciorek | .................. B60N 3/14 439/668 |
| 2007/0059980 A1 | * | 3/2007 | Kemelman | ........ H01R 13/5845 439/604 |

* cited by examiner

*Primary Examiner* — Phuongchi T Nguyen

(57) ABSTRACT

An electronic charging device for vehicles comprises a stretchable contact head, a housing connected with the contract head, an outside diameter of a bottom part of the housing is equal to an inside diameter of a power taking mouth of a vehicle cigarette lighter, a power adapter is located inside the housing, the power adapter has a first electrode contact and a second electrode contact, the first electrode contact is located at the bottom part of the housing, a top area of the contract head is defined as the second electrode contact, a top part of the housing has a charging port, the charging port is connected with the power adapter, the housing further includes a limiting element, the limiting element is clamped with the contract head through a clamping piston structure, the housing further has a spring, one end of the spring resists the contract head.

11 Claims, 3 Drawing Sheets

ELECTRONIC CHARGING DEVICE FOR VEHICLES AND METHOD FOR MAKING SAME

BACKGROUND

1. Technical Field

The present disclosure generally relates to an electronic charging device for vehicles, especially relates to an electronic charging device for vehicles having a stretchable contact head, and a method for making the electronic charging device for vehicles having a stretchable contact head.

2. Description of Related Art

The electronic charging device for vehicles are daily charging equipment used in cars, the electronic charging device for vehicles can charge mobile electronic devices through the charging taking mouth of the vehicle cigarette lighter to improve the battery performance of the mobile electronic devices. After the traditional electronic charging device for vehicles are connected with the charging taking mouth, if the vehicles bump along the way, the power taking devices may be unstably contacted with the electrode of the charging taking mouth, especially, when the charging taking mouth is not clamped in a clamp, the charging taking mouth may be easily separated from the power taking devices, such that the power taking devices cannot provide a stable charging function.

Therefore, a need exists in the industry to overcome the described problems.

SUMMARY

The disclosure is to offer an electronic charging device for vehicles having a stretchable contact head and a method for making the electronic charging device for vehicles having a stretchable contact head.

An electronic charging device for a vehicle, comprises a stretchable contact head, and a housing connected with the contract head, an outside diameter of a bottom part of the housing is equal to an inside diameter of a power taking mouth of a vehicle cigarette lighter, a power adapter is located inside the housing, the power adapter has a first electrode contact and a second electrode contact, the first electrode contact is located at the bottom part of the housing, a top area of the contract head is defined as the second electrode contact, a top part of the housing has a charging port, the charging port is connected with the power adapter, the housing further includes a limiting element, a first clamping structure of the limiting element is clamped with a second clamping structure of the contract head, the contract head slips relative to the limiting element due to the first clamping structure and the second clamping structure, and the contact head and the limiting element cooperatively form a clamping piston structure through the first clamping structure and the second clamping structure, the housing further has a spring, one end of the spring resists the contract head.

Preferably, the top area of the contact head has two opposite first posts and two opposite second posts which are orderly arrayed from inside to outside, an outer surface of each second post has a clamp; the limiting element has two opposite first limiting posts corresponding to the first posts and two opposite second limiting posts corresponding to the second posts, each second limiting post has one limiting clamp, the limiting clamps are clamped with the clamps, the spring passes through a space between the two first posts and then resists the contract head.

Preferably, two opposites edges of the contract head extend over the two second posts respectively.

Preferably, two opposites edges of the contract head parallel to the two second posts respectively.

Preferably, one end of each clamp away from the top area has a first slant surface, an opposite end of each clamp is a right angle; one end of each limiting clamp has a second slant surface, an opposite end of the limiting clamp is a right angle, the first slant surfaces of the clamp correspond to the second slant surfaces of the limiting clamps.

Preferably, the first electrode contact of the power adapter is located on a plug of the housing, and the plug is formed on a outer surface of the housing.

Preferably, the housing has a pair of through holes, the first electrode contact of the power adapter is a pair of elastic snap rings, the elastic snap rings are located in the through holes.

Preferably, the top area of the contract head is tapered.

A method for making an electronic charging device for a vehicle, comprising: a housing and a contract head are provided, the housing has a limiting element, the limiting element is clamped with the contract head; the contract head is cooled firstly; the limiting element is heated until a temperature of the limiting element is about 80~110° C., then the contract head is mounted into the limiting element; the limiting element cools naturally to form a clamping piston structure, the contract head is connected with the limiting element through the clamping piston structure.

Preferably, the contract head is made of a metal, the limiting element is made of a resin.

Preferably, when the temperature of the limiting element is 100° C., the contract head is pressed into the limiting element.

Compared to the traditional electronic charging device for vehicles, the contract head is elastically connected with the spring, and the spring can resist the contract head to connected the contract head with the second electrode continuously. Furthermore, the structure of the electronic charging device for vehicles is simple, and the electronic charging device for vehicles can be used for various kinds of charging taking mouth.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
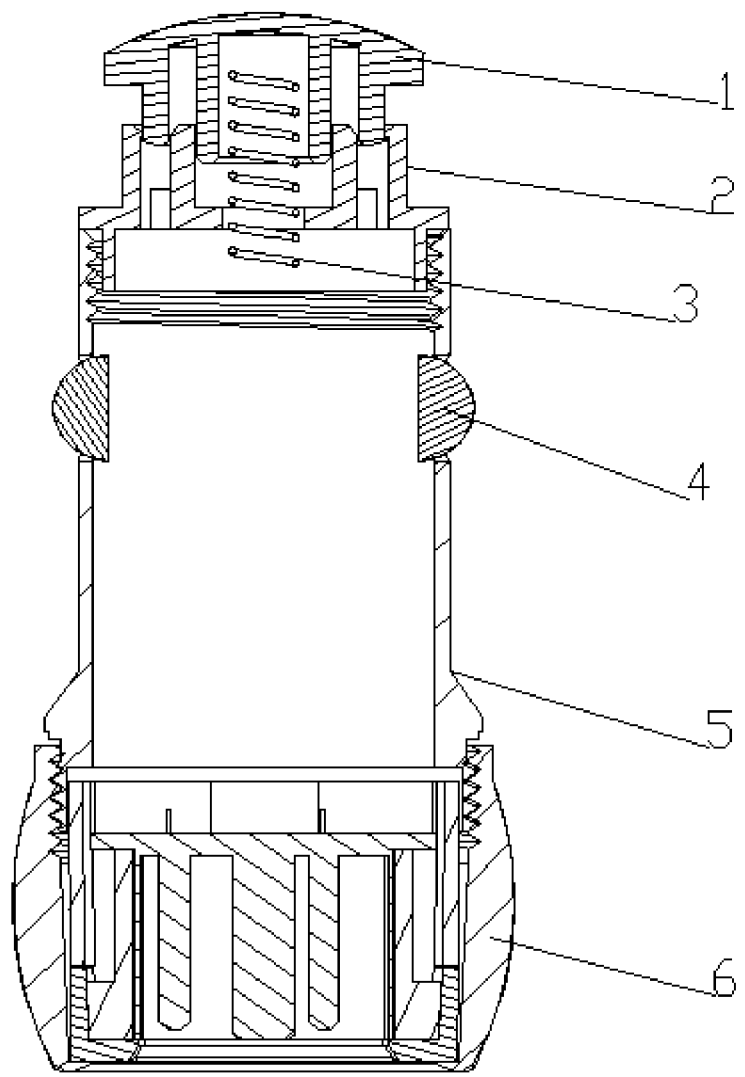
FIG. 1 is a cross-section view of an electronic charging device for vehicles having a stretchable contact head according to an exemplary embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
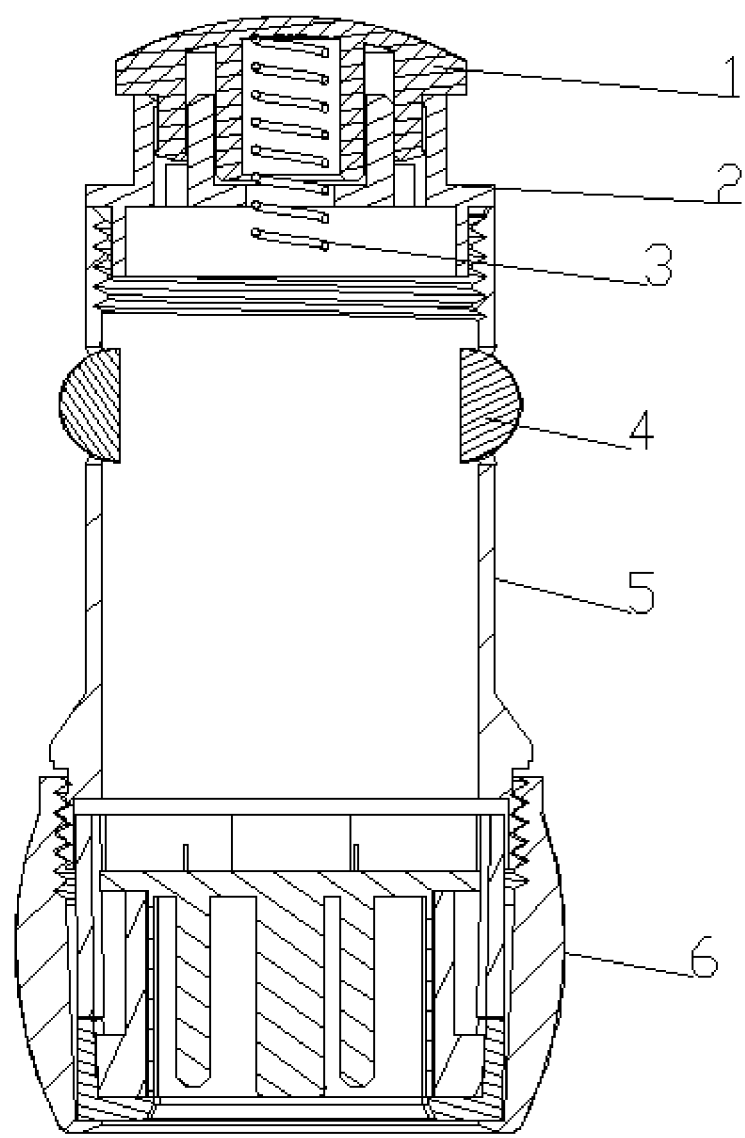
FIG. 2 is a cross-section view of a compressed electronic charging device for vehicles having a stretchable contact head according to an exemplary embodiment.

With reference to FIGS. 1-2, an electronic charging device for vehicles having a stretchable contact head includes a housing 5, an outside diameter of a bottom part of the housing 5 is equal to an inside diameter of a vehicle cigarette lighter, a power adapter (not shown) is located inside the housing 5, the power adapter has a first electrode contact which is located at the bottom part of the housing, furthermore, the first electrode contact of the power adapter is located on a plug of the housing 5, and the plug is formed on a outer surface of the housing 5, and the housing 5 is connected with a contact head 1, a top part of the housing 5 is connected with a charging port 6 through a threaded connection mode, and the charging port 6 can be connected with the power adapter. The housing 5 further has a limiting element 2, a first clamping structure of the limiting element 2 can be clamped with a second clamping structure of the contract head, such that the limiting element 2 can be connected with the contract head 1 through the first clamping structure and the second clamping structure. The contact head 1 can slip relative to the limiting element 2 through the first clamping structure and the second clamping structure, such that, the contact head 1 and the limiting element 2 can cooperatively form a clamping piston structure through the first clamping structure and the second clamping structure. A spring 3 can be located inside the housing 5, and one end of the spring 3 resists the contact head 1.

Figure 3:
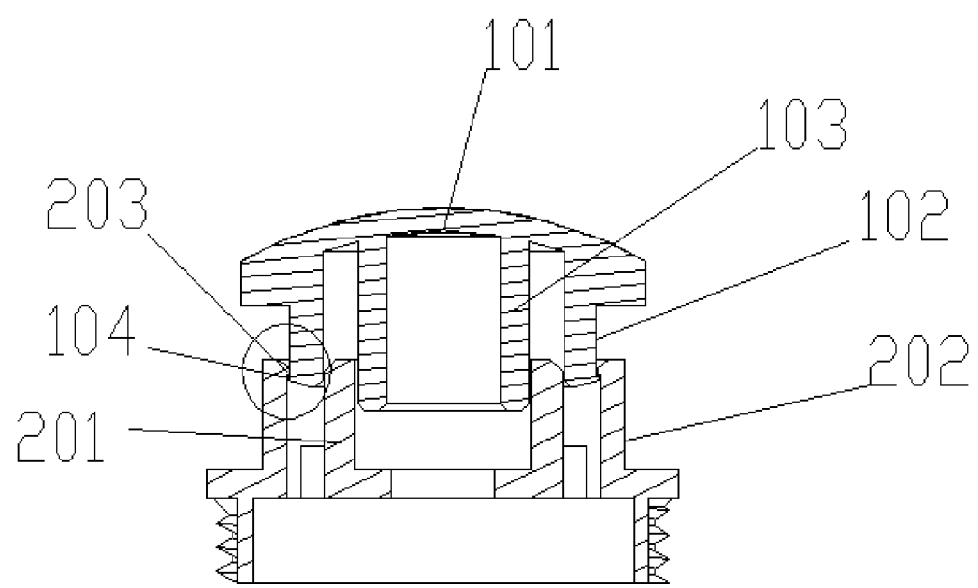
FIG. 3 is an isometric view of a contact head and a limiting element of the electronic charging device for vehicles according to an exemplary embodiment.

Referring to FIG. 3, a top area 101 of the contact head 1 has two opposite first posts 101 and two opposite second posts 102 which are orderly arrayed from inside to outside, an outer surface of each second post 102 has a clamp 104, and two opposites edges of the top area 101 can extend over the two second posts 102 respectively, or two opposites edges of the top area 101 parallel to the two second posts 102 respectively, and the top area 101 of the contact head 1 can be a projection; the limiting element 2 has two opposite first limiting posts 201 corresponding to the first posts 103 and two opposite second limiting posts 202 corresponding to the second posts 102, each second limiting post 202 has one limiting clamp 203 which can be clamped with the clamps 104.

It is to be understood that, the contact head 1 can be made of a metal, the limiting element 2 can be made of a resin.

One end of each clamp 104 away from the top area 101 has a first slant surface, an opposite end of each clamp 104 can be a right angle; one end of each limiting clamp 203 has a second slant surface, an opposite end of the limiting clamp 203 can be a right angle, the first slant surfaces of the clamp 104 correspond to the second slant surfaces of the limiting clamps 203. When making the electronic charging device for vehicles, the contract head 1 is cooled firstly, when a temperature of the limiting element 2 is about 80~110° C., the contract head 1 can be mounted into the limiting element 2, preferably, when the temperature of the limiting element 2 is about 100° C., the contacted head 1 is mounted into the limiting element 2, after the limiting element 2 cools, the limiting element 2 and the contract head 1 cooperatively form the clamping piston structure naturally.

The spring 3 passes through a space formed between the two opposite first posts 103, and then resists the top area 101 of the contact head 1.

The top area 101 of the contact head 1 can be a second electrode contact of the power adapter; the first electrode contact of the power adapter is a pair of elastic snap rings 4, the housing 5 has two through holes, the elastic snap rings 4 are received in the through holes respectively, when the power taking device is located in a charging mouth of the cigarette lighter, the top area 101 and the elastic snap rings 4 are both contacted with electrodes, circuits of the power taking device can be connected, such that the electronic charging device for vehicles can be used.

In use, the electronic charging device for vehicles is located in the charging mouth of the vehicle, the contact head 1 contacts the electrode of the charging mouth, the charging port 6 can be connected with a charger to process the charging operation. However, when the vehicle bumps along a way, the power taking device may move, and the contact head 1 can also move forward due to the elastic force of the spring 3, such that the contract head 1 can still be connected with the second electrode stably. The structure of the electronic charging device for vehicles is simple, and the electronic charging device for vehicles can be used for various kinds of charging taking mouth, such as the barreled charging taking mouth and the shrapnel type charging taking mouth.

In another exemplary embodiment, the limiting element 2 can be the housing 5, that is, the limiting element 2 is integrated with the housing 5.

In another exemplary embodiment, the limiting element 2 is made of the metal, and when the electronic charging device for vehicles is assembled, the first slant surfaces of the clamps 104 of the contract head 1 face the second slant surfaces of the limiting clamps 203 of the limiting elements 2 respectively, and the contract head 1 is pressed into the limiting element 2, such that the contract head 1 clamps with the limiting element 2, and forms the clamping piston structure.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. An electronic charging device for a vehicle, comprising,
   a stretchable contact head,
   a housing connected with the contract head, an outside diameter of a bottom part of the housing being equal to an inside diameter of a power taking mouth of a vehicle cigarette lighter, a power adapter being located inside the housing, the power adapter having a first electrode contact and a second electrode contact, the first electrode contact being located at the bottom part of the housing, a top area of the contract head being defined as the second electrode contact, a top part of the housing having a charging port, the charging port being connected with the power adapter, the housing further including a limiting element, a first clamping structure of the limiting element being clamped with a second clamping structure of the contract head, the contract head slipping relative to the limiting element due to the first clamping structure and the second clamping structure, and the contact head and the limiting element cooperatively forming a clamping piston structure through the first clamping structure and the second clamping structure, the housing further having a spring, one end of the spring resisting the contract head.

2. The electronic charging device of claim 1, wherein the first electrode contact of the power adapter is located on a plug of the housing, and the plug is formed on a outer surface of the housing.

3. The electronic charging device of claim 1, wherein the housing has a pair of through holes, the first electrode contact of the power adapter is a pair of elastic snap rings, the elastic snap rings are located in the through holes.

4. The electronic charging device of claim 1, wherein the top area of the contract head is tapered.

5. The electronic charging device of claim 1, wherein the top area of the contact head has two opposite first posts and two opposite second posts which are orderly arrayed from inside to outside, an outer surface of each second post has a clamp; the limiting element has two opposite first limiting posts corresponding to the first posts and two opposite second limiting posts corresponding to the second posts, each second limiting post has one limiting clamp, the limiting clamps are clamped with the clamps, the spring passes through a space between the two first posts and then resists the contract head.

6. The electronic charging device of claim 5, wherein two opposites edges of the contract head extend over the two second posts respectively.

7. The electronic charging device of claim 5, wherein two opposites edges of the contract head parallel to the two second posts respectively.

8. The electronic charging device of claim 5, wherein one end of each clamp away from the top area has a first slant surface, an opposite end of each clamp is a right angle; one end of each limiting clamp has a second slant surface, an opposite end of the limiting clamp is a right angle, the first slant surfaces of the clamp correspond to the second slant surfaces of the limiting clamps.

9. A method for making an electronic charging device for a vehicle, comprising:
   providing a housing and a contract head, the housing having a limiting element, the limiting element being clamped with the contract head;
   the contract head being cooled firstly;
   heating the limiting element until a temperature of the limiting element being about 80~110° C., then mounting the contract head into the limiting element;
   the limiting element cooling naturally to form a clamping piston structure, the contract head being connected with the limiting element through the clamping piston structure.

10. The method for making the electronic charging device of claim 9, wherein the contract head is made of a metal, the limiting element is made of a resin.

11. The method for making the electronic charging device of claim 9, wherein when the temperature of the limiting element is 100° C., the contract head is pressed into the limiting element.

* * * * *